O. A. JOHNSON.
STEPPING MECHANISM FOR VEHICLES.
APPLICATION FILED APR. 27, 1916.
1,232,689.
Patented July 10, 1917.
2 SHEETS—SHEET 1.
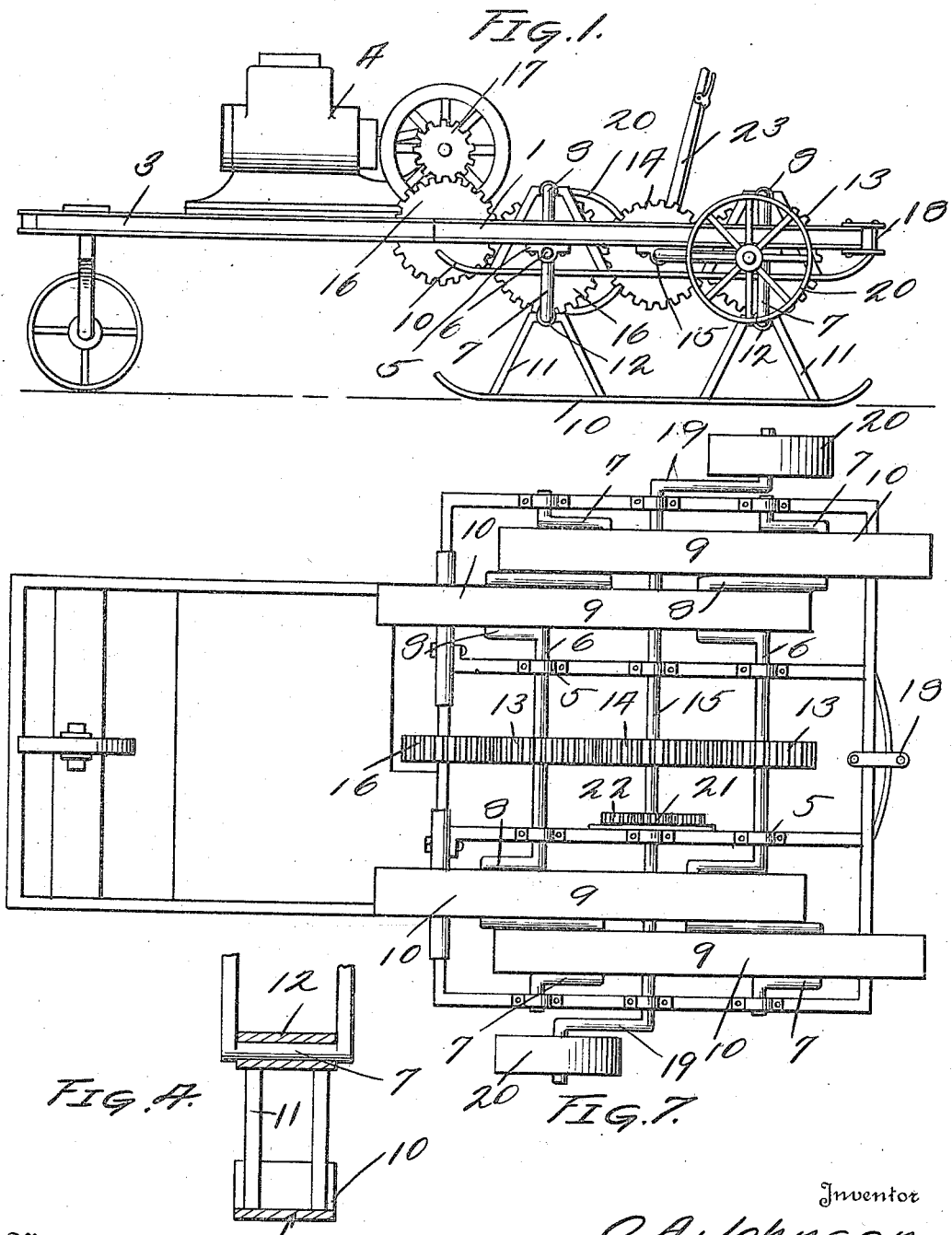
Inventor
O. A. Johnson

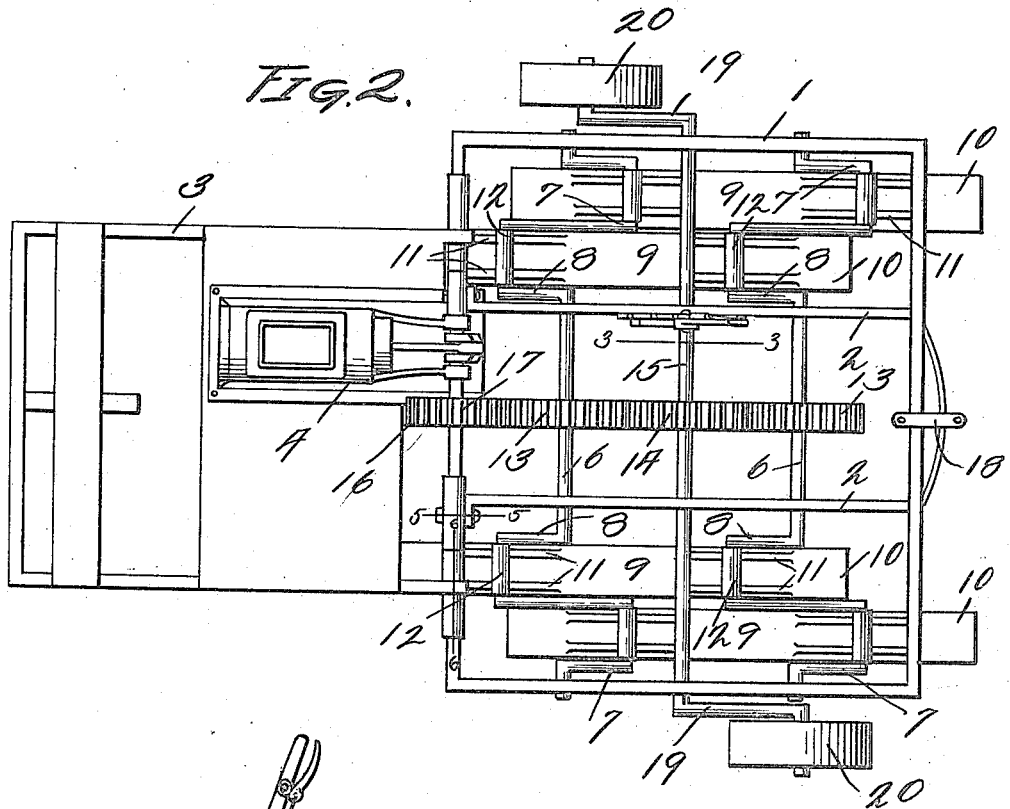

UNITED STATES PATENT OFFICE.

OSCAR A. JOHNSON, OF WILSALL, MONTANA.

STEPPING MECHANISM FOR VEHICLES.

1,232,689.                  Specification of Letters Patent.        Patented July 10, 1917.

Application filed April 27, 1916. Serial No. 93,971.

*To all whom it may concern:*

Be it known that I, OSCAR A. JOHNSON, a citizen of the United States, residing at Wilsall, in the county of Park, State of Montana, have invented certain new and useful Improvements in Stepping Mechanism for Vehicles; and I do hereby declare the following to be a full, clear, and exact description of the invention, such as will enable others skilled in the art to which it appertains to make and use the same.

This invention relates to stepping mechanisms for vehicles and has as its principal object to provide a practical driving device for wheels in propelling a vehicle over snow covered or other surfaces where wheels have difficulty in securing a tractive hold.

With these and other objects in view, such as will appear as my description progresses, my invention comprises the combination and arrangement of parts as set forth in and falling within the scope of the appended claim.

In the drawing:

Figure 1 is a side elevation of a device constructed in accordance with my invention;

Fig. 2 is a plan view thereof;

Fig. 3 is a vertical sectional view on line 3—3 of Fig. 2;

Fig. 4 is a fragmental detail of one of the drivers;

Fig. 5 is a fragmental detail showing the manner of mounting the main driving gear upon the end bar of the frame;

Fig. 6 is a fragmental sectional view showing the manner of mounting the engine frame on the main frame, and Fig. 7 is a bottom plan view.

Referring to the drawing by reference characters wherein like parts are indicated by like characters throughout the several views:

In the drawing, I have illustrated a frame 1 which is rectangular and is braced by suitable cross bars 2 which are bolted to the frame. Extending from the frame 1 is a frame 3, the forward portion thereof having an engine 4 mounted thereon. Extending transversely of the frame 1 and mounted in bearings 5 are crank shafts 6 each of which is provided with crank portions 7 and 8. A plurality of drivers 9 is provided which are connected to these crank portions in a manner which will now be described. Each of these drivers includes a shoe portion 10 from which upwardly extending braces 11 extend. Bearings 12 are mounted on the upper ends of these braces 11 through which bearings the crank portions of the shafts 6 extend. By observing Fig. 2 of the drawing, it will be noted that a pair of drivers is connected to the crank portions 8, which crank portions all extend in the same direction and a second pair of drivers is connected to the crank portions 7, which crank portions extend in the opposite direction. In order that the shaft 6 may be rotated so that a stepping action will be given to the drivers, I have provided each of the shafts with a gear 13, both of which gears mesh with a gear 14 loosely mounted on a transversely extending shaft 15. The foremost gear 13 meshes with an additional gear 16, which is loosely mounted upon the forward bar of the frame 1 and which gear 16 meshes with a gear 17 which is driven by the engine 4.

It will thus be seen that when the gears are actuated by the engine the shafts 6 will be rotated and consequently the drivers operated. It will be noted that one driver on each side of the machine will be raised and will move to its rearmost position as the other drivers are lowered into contact with the ground and advance the vehicle.

The frame 1 is provided with a hitch bar 18 for obvious purposes. Now when the drivers are operated in the manner desscribed it is obvious that the vehicle will move straight forwardly or rearwardly and in order that the drivers may be operated to cause the vehicle to turn, I have provided a crank portion 19 on each end of the shaft 15, on which crank portion a wheel 20 is mounted. These crank portions extend in the same direction so that when the shaft is rotated to raise one of the wheels the other will be lowered. It is obvious that when one is lowered the side of the machine on which it is located will be raised so that the drivers on the opposite side of the machine will operate to move that side of the machine around the lowered wheel as a pivot.

In order that these wheels may be raised and lowered at will, I have secured a gear 21 to the shaft 15 with which gear a quadrant rack 22 engages, which rack is mounted on a lever 23. This lever 23 is pivoted on the adjacent brace bar 2 and its movement is controlled by a pawl 24 which operates on a rack 25. By shifting this lever 23 the wheels 20 will be raised or lowered as desired.

While I have illustrated and described a particular embodiment of my invention, it has merely been for the sake of convenience and I do not wish to be limited to that particular embodiment as it is obvious that numerous changes may be made in the details of construction without departing from the spirit of the invention or exceeding the scope of the appended claim.

What I claim is:—

In a device of the class described, the combination with a frame, of drivers mounted on each side thereof and means for raising the drivers on either side of the frame, from the ground, the said means including a transversely extending shaft having oppositely extending crank portions on the ends thereof, wheels mounted on the crank portions and means for rotating the shaft.

In testimony whereof, I affix my signature, in the presence of two witnesses.

OSCAR A. JOHNSON.

Witnesses:
F. J. KENSHAW,
D. C. YOUNGER.

Copies of this patent may be obtained for five cents each, by addressing the "Commissioner of Patents, Washington, D. C."